(12) United States Patent
Raja et al.

(10) Patent No.: US 7,659,679 B2
(45) Date of Patent: Feb. 9, 2010

(54) SYSTEM AND METHOD FOR ADJUSTING A DEAD-TIME INTERVAL IN A MOTOR CONTROL CIRCUIT

(75) Inventors: Ramakrishnan Raja, Saginaw, MI (US); Mohammad S. Islam, Saginaw, MI (US); Paul M. Fisher, Saginaw, MI (US); Tomy Sebastian, Saginaw, MI (US); Lucas W. Wendling, New Lothrop, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 387 days.

(21) Appl. No.: 11/622,784

(22) Filed: Jan. 12, 2007

(65) Prior Publication Data

US 2008/0169777 A1 Jul. 17, 2008

(51) Int. Cl.
*H02P 31/00* (2006.01)
(52) U.S. Cl. .................................. 318/484; 318/488
(58) Field of Classification Search ......... 318/430–434, 318/445–447, 484, 488–489
See application file for complete search history.

(56) References Cited

U.S. PATENT DOCUMENTS

| 5,506,484 | A | * | 4/1996 | Munro et al. | 318/599 |
|---|---|---|---|---|---|
| 5,550,450 | A | * | 8/1996 | Palko et al. | 318/800 |
| 5,625,264 | A | * | 4/1997 | Yoon | 318/400.06 |
| 5,872,710 | A | * | 2/1999 | Kameyama | 363/95 |
| 6,362,593 | B1 | * | 3/2002 | Lee | 318/801 |
| 6,373,211 | B1 | | 4/2002 | Henry et al. | |
| 6,498,449 | B1 | | 12/2002 | Chen et al. | |
| 6,498,451 | B1 | | 12/2002 | Boules et al. | |
| 6,535,402 | B1 | * | 3/2003 | Ying et al. | 363/41 |
| 6,847,532 | B2 | * | 1/2005 | Villaret | 363/132 |
| 6,914,399 | B2 | * | 7/2005 | Kushion et al. | 318/434 |
| 7,126,304 | B2 | * | 10/2006 | Suzuki | 318/400.04 |
| 2004/0027083 | A1 | * | 2/2004 | Suzuki | 318/434 |
| 2005/0025231 | A1 | * | 2/2005 | Mitsuki | 375/238 |
| 2005/0190005 | A1 | * | 9/2005 | Katsuki et al. | 332/109 |
| 2006/0049784 | A1 | * | 3/2006 | Suzuki | 318/139 |

* cited by examiner

*Primary Examiner*—Bentsu Ro
(74) *Attorney, Agent, or Firm*—Cantor Colburn LLP

(57) ABSTRACT

A system and a method for adjusting a dead-time interval between de-activating a first transistor and activating a second transistor in a motor control circuit are provided. The method includes determining a plurality of commanded torque values associated with a motor based on a received signal over time. The method further includes setting the dead-time interval value equal to a first value when one commanded torque value of the plurality of commanded torque values is within a first torque range. The method further includes decreasing the dead-time interval value as other commanded torque values of the plurality of commanded torque values increase over time within a second torque range. The second torque range is greater than the first torque range. The dead-time interval value is indicative of a desired dead-time interval.

15 Claims, 5 Drawing Sheets

SYSTEM AND METHOD FOR ADJUSTING A DEAD-TIME INTERVAL IN A MOTOR CONTROL CIRCUIT

TECHNICAL FIELD

This application relates to a system and a method for adjusting a dead-time interval between de-activating a first transistor and activating a second transistor in a motor control circuit.

BACKGROUND

A motor control system generates pulse width modulated signals to drive a control circuit to power a permanent magnet (PM) motor. The control circuit has several pairs of transistors where each pair of transistors (e.g., first and second transistors) is electrically coupled in series to one another. Further, a period between de-activating the first transistor and activating the second transistor is known as a "dead-time interval." Without the dead-time interval, the first and second transistors would conduct at the same time and cause a relatively high current to flow through the first and second transistors from a voltage source to electrical ground without current flowing through a motor winding.

A problem with the above motor control system is that the system utilized a static non-changeable dead-time interval. Further, because the system is unable to adjust the dead-time interval, undesirable torque ripple can occur in a motor during certain commanded torque conditions.

Accordingly, the inventors herein have recognized a need for an improved system and method that can adjust a dead-time interval between de-activating a first transistor and activating a second transistor in a motor control circuit.

SUMMARY OF THE INVENTION

A method for adjusting a dead-time interval between de-activating a first transistor and activating a second transistor in a motor control circuit in accordance with an exemplary embodiment is provided. The first and second transistors are electrically coupled in series with one another. The method includes determining a plurality of commanded torque values associated with a motor based on a received signal over time. Each commanded torque value of the plurality of commanded torque values is indicative of a commanded torque level of the motor. The method further includes setting the dead-time interval value equal to a first value when one commanded torque value of the plurality of commanded torque values is within the first torque range. The method further includes decreasing the dead-time interval value as other commanded torque values of the plurality of commanded torque values increase over time within a second torque range. The second torque range is greater than the first torque range. The dead-time interval value is indicative of a desired dead-time interval.

A motor control system for adjusting a dead-time interval between de-activating a first transistor and activating a second transistor in a motor control circuit in accordance with another exemplary embodiment is provided. The first transistor and the second transistor are electrically coupled in series with one another. The first and second transistors are electrically coupled to at least one motor winding. The motor control system includes a handwheel torque sensor configured to generate a signal indicative of commanded torque levels of a motor over time. The motor control system further includes a controller configured to receive the signal and to determine a plurality of commanded torque values associated with a motor based on the signal. Each commanded torque value of the plurality of commanded torque values is indicative of a commanded torque level of the motor. The controller is further configured to set the dead-time interval value equal to a first value when one commanded torque value of the plurality of commanded torque values is within a first torque range. The controller is further configured to decrease the dead-time interval value as other commanded torque values of the plurality of commanded torque values increase over time within a second torque range. The second torque range is greater than the first torque range. The dead-time interval is indicative of a desired dead-time interval.

DESCRIPTION OF EXEMPLARY EMBODIMENTS

Figure 1:
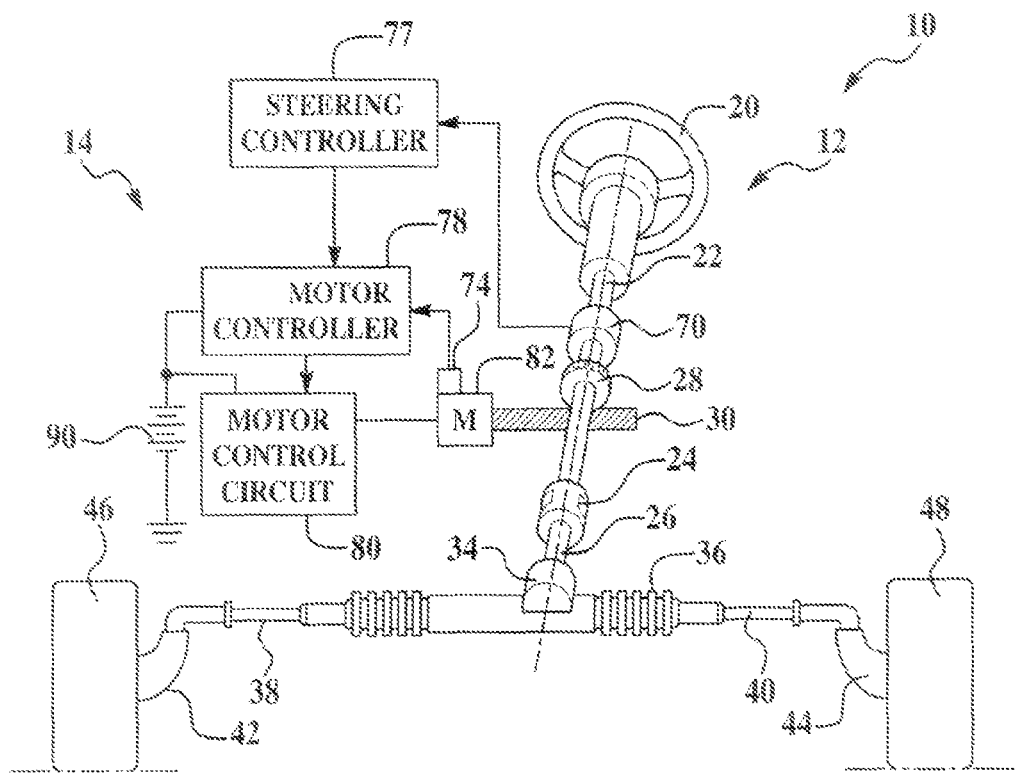
FIG. 1 is a schematic of a vehicle having a steering system and a control system in accordance with an exemplary embodiment.
Figure 2:
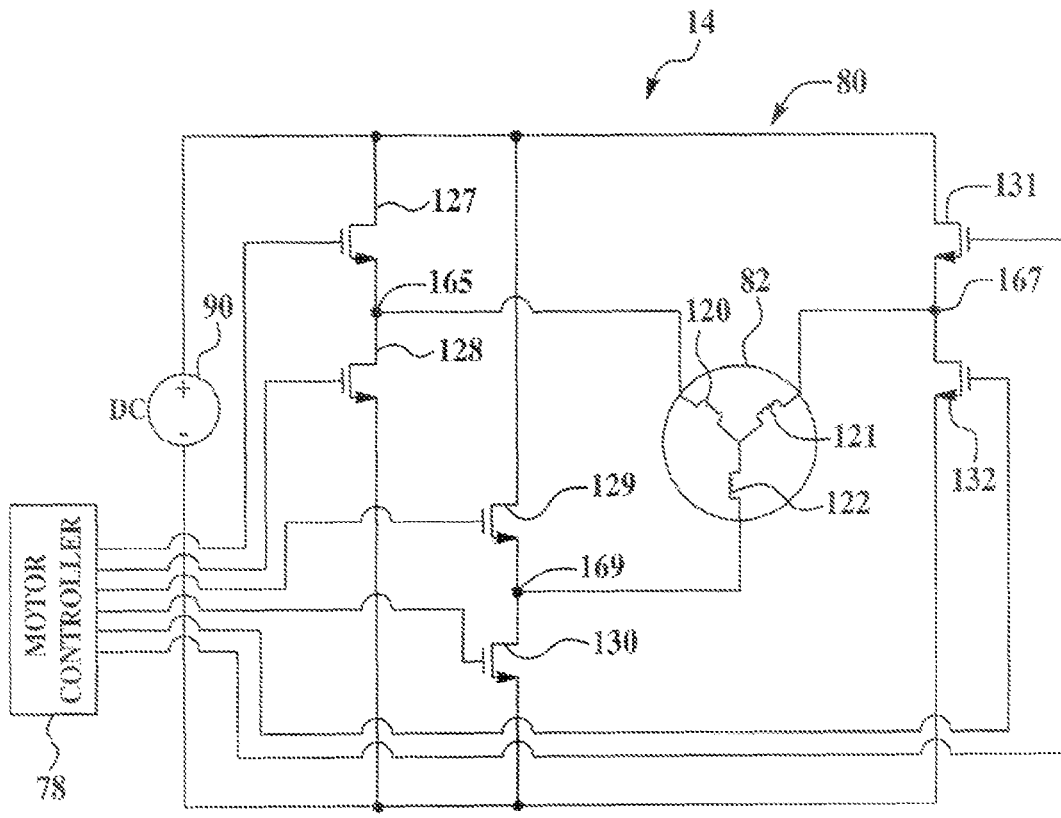
FIG. 2 is an electrical schematic of the control system of FIG. 1.

Referring to FIGS. 1 and 2, a vehicle 10 having a steering system 12 and a motor control system 15 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar vales, or the like.

The steering system 12 is provided to steer the vehicle 10 in a desired direction. The steering system includes a handwheel 20, and upper steering shaft 22, a universal joint 24, a lower steering shaft 26, a worm gear 28, a worm 30, a gear housing 34, a rack and pinion steering mechanism 36, tie rods 38, 40, steering knuckles 42, 44, and roadway wheels 46, 48. In one exemplary embodiment, the steering system 12 is an electric power steering system that utilized the rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering shaft 22 connected to the lower steering shaft 26 turns the pinion gear. Rotation of the pinion gear moves the toothed rack which moves the tie rods 39, 40 which in turns moves the steering knuckles 42, 44, respectively, and the roadway wheels 46, 48, respectively.

The motor control system 14 is provided to control operation of the motor 82 in order to assist a vehicle operator in steering the vehicle 10. The control system 14 includes a handwheel torque sensor 70, a steering controller 77, a motor controller 78, and a motor control circuit 80.

The handwheel torque sensor 70 is provided to generate a signal indicative of an amount of torque being applied to the vehicle handwheel 20 by a vehicle operator. In one exemplary embodiment, the handwheel torque sensor 70 includes a torsion bar (not shown) which outputs a signal to the controller 78 based on an amount of twist of the torsion bar.

The steering controller 77 is provided to generate a commanded torque value for the motor 82 based on the signal from the handwheel torque sensor 70. The steering controller 77 sends the commanded torque value to the motor controller 78.

The motor controller 78 is provided to determine dead-time intervals associated with transistors in the motor control circuit 80. Further, the motor control circuit 78 is configured to generate control signals that are received by the motor control circuit 80 for controlling operation of the motor 82, based on the commanded torque value received from the controller 88. The operation of the motor controller 78 will be explained in greater detail hereinafter.

Referring to FIG. 2, the motor control circuit 80 is provided to generate commutation pulses for controlling operation of a three-phase brushless electrical motor 82. The motor includes phase coils 120, 121, and 122 having a Y-configuration, and a rotor (not shown). The motor control circuit 80 includes switches 127, 128, 129, 130, 131 and 132.

The switches 127, 128, 129, 130, 131 and 132 are provided to selectively couple the battery 90 with phase coils 120, 121, 122 to energize and de-energize the coils. Switches 127, 128, 129, 130, 131 and 132 may take any of a plurality of forms well-known in the art. For example, the switches may comprise MOSFETs. As shown, the switches 127, 128 are connected in series between positive and negative terminals of battery 90. A node 165 between switches 127, 128 is electrically coupled to the phase coils 120. The switches 131, 132 are connected in series between positive and negative terminals of the battery 90. A node 167 between switches 131, 132 is electrically coupled to the phase coil 121. The switches 129, 130 are connected in series between positive and negative terminals of the battery 90. A node 169 between switches 129, 130 is electrically coupled to the phase coil 122.

Figure 3:
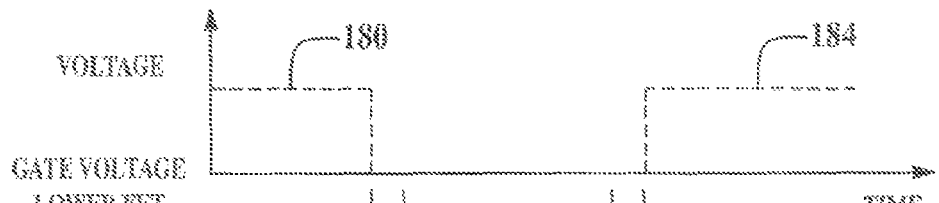
FIG. 3 is a schematic of a signal applied to a first transistor in a motor control circuit in the control system of FIG. 2.
Figure 4:
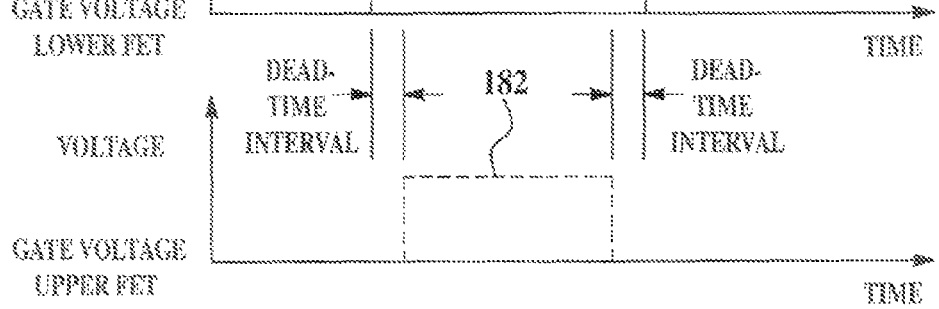
FIG. 4 is a schematic of a signal applied to a second transistor in a motor control circuit.

Referring to FIGS. 2, 3 and 4, a brief explanation of a dead time interval will now be provided. Voltage phases 180, 184 are applied to a gate of the transistor 127 and a voltage pulse 182 is applied to a gate of the transistor at 128. The transistors 127, 128 are electrically coupled in series with one another. The time interval from when the voltage pulse 180 transitions from a high voltage level to a low voltage level to when the voltage pulse 182 transitions from a low voltage level to a high voltage level is the dead-time interval. In one exemplary embodiment, the desired dead-time interval is in a range of 100-250 nanoseconds when high-current low-voltage MOSFETs are utilized in the motor control circuit 80. Of course in alternative embodiments the desired dead-time interval could be less than 100 nanoseconds or greater than 250 nanoseconds.

Figure 5:
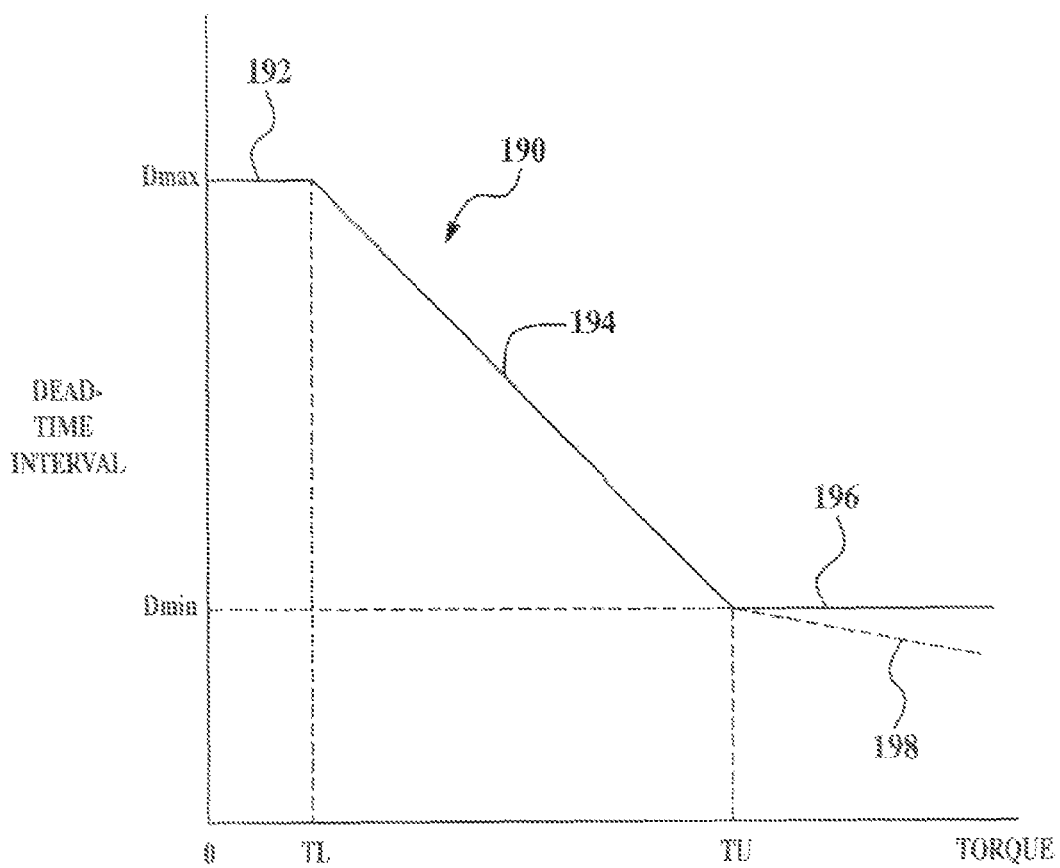
FIG. 5 is an exemplary curve illustrating a change in a dead-time interval based on commanded torque values.

Referring to FIG. 5, an exemplary curve 190 illustrating adjustment of a dead-time interval value based on a commanded motor torque will now be explained. The curve 190 has curve portions 192, 194, and 196. As shown by curve portion 192, when the motor has a commanded motor torque values in a range of 0-TL, the dead-time interval value is maintained at a value (Dmax). Further, as shown by curve portion 194, when the motor has commanded motor torque values that are increased form (TL) to (TU), the dead-time interval value is decreased from (Dmax) to (Dmin). Further, as shown by curve portion 196, when the motor has commanded motor torque values greater than (TU), the dead-time interval value is maintained at (Dmin). Of course in an alternative embodiment, when the motor has commanded motor torque values greater than (TU), the dead-time interval value could be decreased due to increasing command torque values as shown by curve portion 198. It should also be noted that in alternative embodiments, the curve portions 192, 194 could be non-linear curves.

Figure 6:
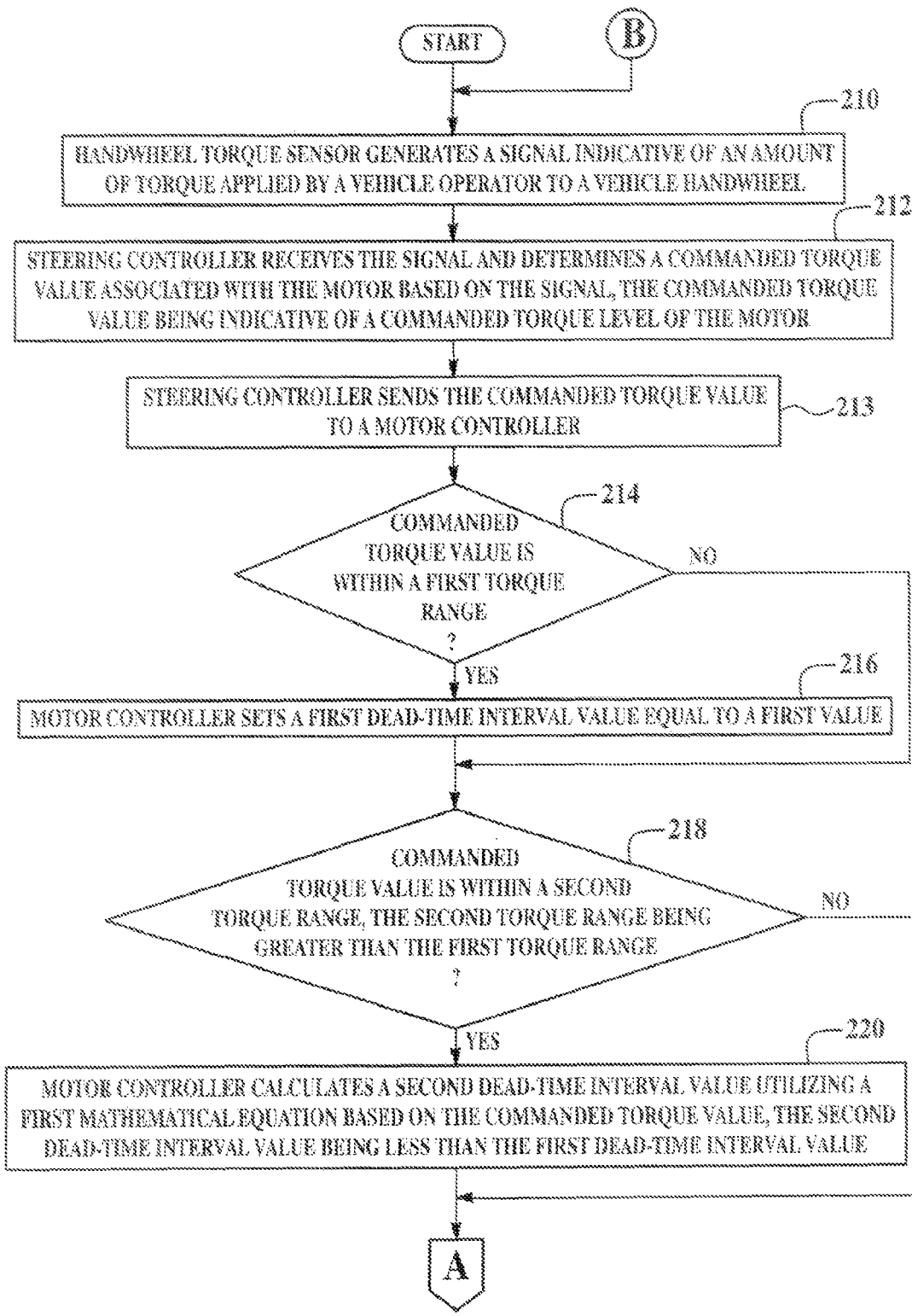
FIGS. 6-7 are flowcharts of a method for adjusting a dead-time interval utilizing the control system of FIG. 2.
Figure 7:
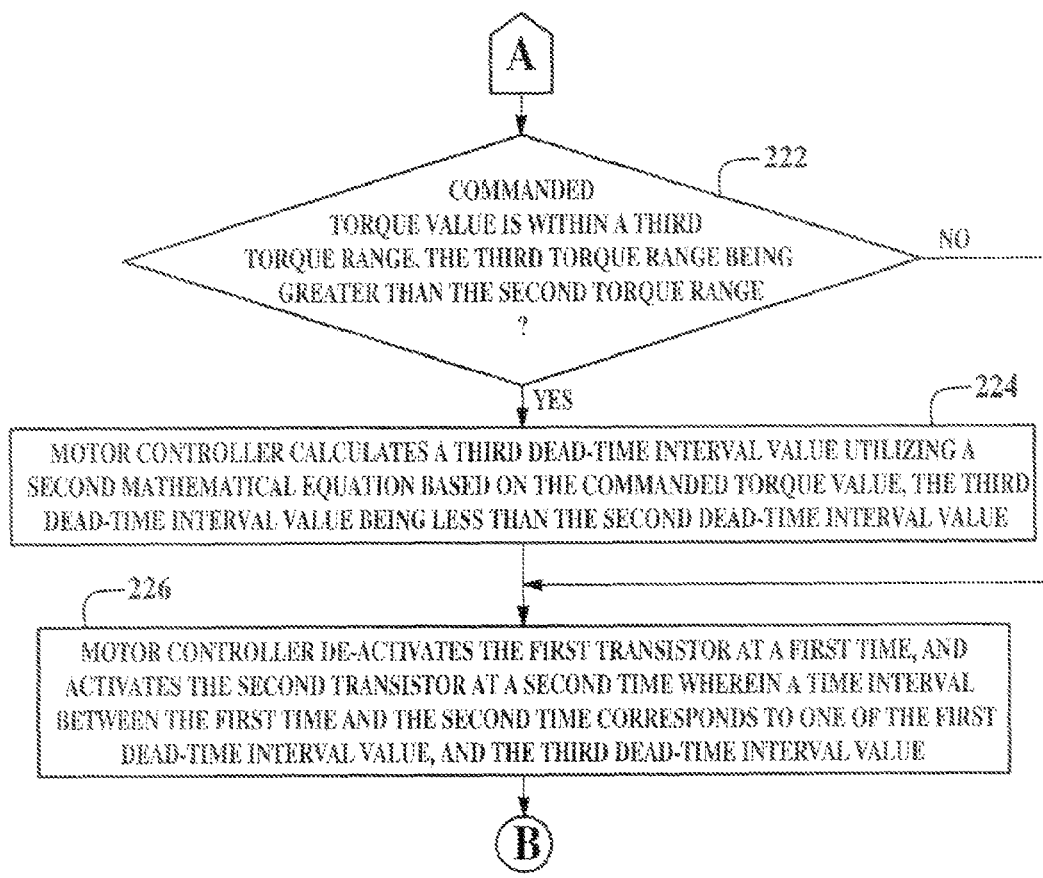

Referring to FIGS. 6-7, a flowchart for a method for adjusting a dead-time interval between de-activating the transistor 127 and activating the transistor 128 in the motor control circuit 80 will now be explained. The method can be at least partially implemented utilizing algorithms in the steering controller 78. It should be noted that although the method will be explained utilizing the transistor pair 127, 128, the method can additionally be implemented utilizing the transistor pair 129, 130 and the transistor pair 131, 132.

At step 210, the handwheel torque sensor 70 generates a signal indicative of an amount of torque applied by a vehicle operator to the vehicle handwheel 20.

At step 212, the steering controller 77 receives the signal and determines a commanded torque value associated with the motor 82 based on the signal. The commanded torque value is indicative of a commanded torque level of the motor 82.

At step 214, the motor controller 78 makes a determination as to whether the commanded torque value is within a first torque range. If the value of step 214 equals "yes", the method advances to step 216. Otherwise, the method advances to step 218.

At step 216, the motor controller 78 sets a first dead-time interval value equal to a first value. After step 216, the method advances to step 218.

At step 218, the motor controller 78 makes a determination as to whether the commanded torque value is within a second torque range. The second torque range is greater than the first torque range. If the value of step 218 equals "yes", the method advances to step 220. Otherwise, the method advances to step 222.

At step 220, the motor controller 78 calculates a second dead-time interval value utilizing a first mathematical equation based on the commanded torque value. The second dead-time interval value is less than the first dead-time interval value. After step 220, the method advances to step 222.

At step 222, the motor controller 78 makes a determination as to whether the commanded torque value is within a third torque range. The third torque range is greater than the second torque range. If the value of step 222 equals "yes", the method advances to step 224. Otherwise, the method advances to step 226.

At step 224, the motor controller 78 calculates a third dead-time interval value utilizing a second mathematical equation based on the commanded torque value. The third dead-time interval value is less than the second dead-time interval value. After step 224, the method advances to step 226.

At step 226, the motor controller 78 de-activates the transistor 127 at a first time, and activates the transistor 128 at a second time wherein a time interval between the first time and the second time corresponds to one of the first dead-time interval values, the second dead-time interval value, and the third dead-time interval value. After step 246, the method returns to step 210.

Figure 8:
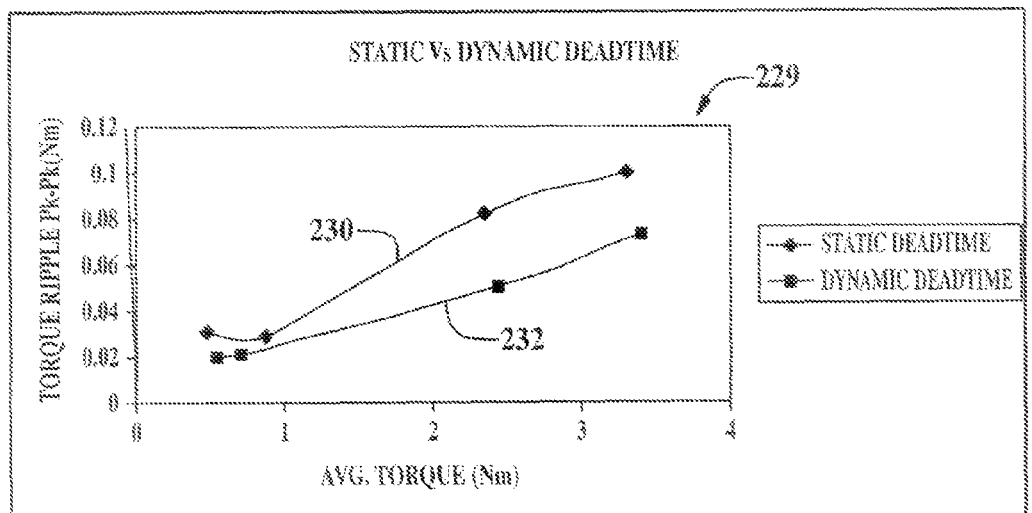
FIG. 8 is graph having a curve indicating an amount of motor torque ripple versus an average motor torque for a static dead-time interval, and a curve indicating an amount of motor torque ripple versus an average motor torque for a dynamic dead-time interval.

Referring to FIG. 8, a graph 229 having curves 230 and 232 is illustrated. The curve 230 indicates an amount of motor torque ripple versus an average motor torque for a static dead-time interval. The curve 232 indicates an amount of motor torque ripple versus an average motor torque for a dynamic dead-time interval. As shown, the amount of torque ripple for a dynamic dead-time interval (e.g., a dead-time interval that changes based on the average motor torque) is less than the amount of torque ripple for a static dead-time interval.

Figure 9:
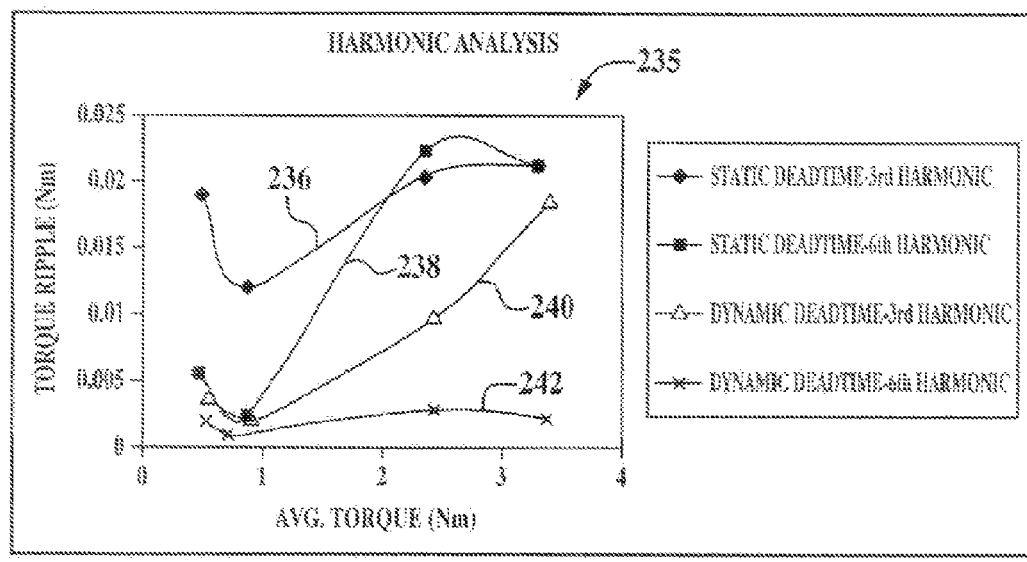
FIG. 9 is a graph having first and second curves indicating an amplitude of third and sixth harmonics of motor torque ripples versus average motor torque for a static dead-time interval, and having third and fourth curves indicating an amplitude of third and sixth harmonics of motor torque ripple versus average motor torque for a dynamic dead-time interval.

Referring to FIG. 9, a graph 235 having curves 236, 238, 240, 242 is illustrated. The curves 236, 238 indicate an amplitude of third and sixth harmonics of motor torque ripple, respectively, versus average motor torque for a static dead-time interval. The curves 240, 242 indicate an amplitude of third and sixth harmonics of motor torque ripple, respectively, versus average motor torque for a dynamic dead-time interval. As shown, an amplitude of the harmonics of the motor torque ripple for a dynamic dead-time interval (e.g., a dead-time interval that changes based on the average motor torque) is less than the amount of the amplitude of the harmonics of the motor torque ripple for a static dead-time interval.

Figure 10:
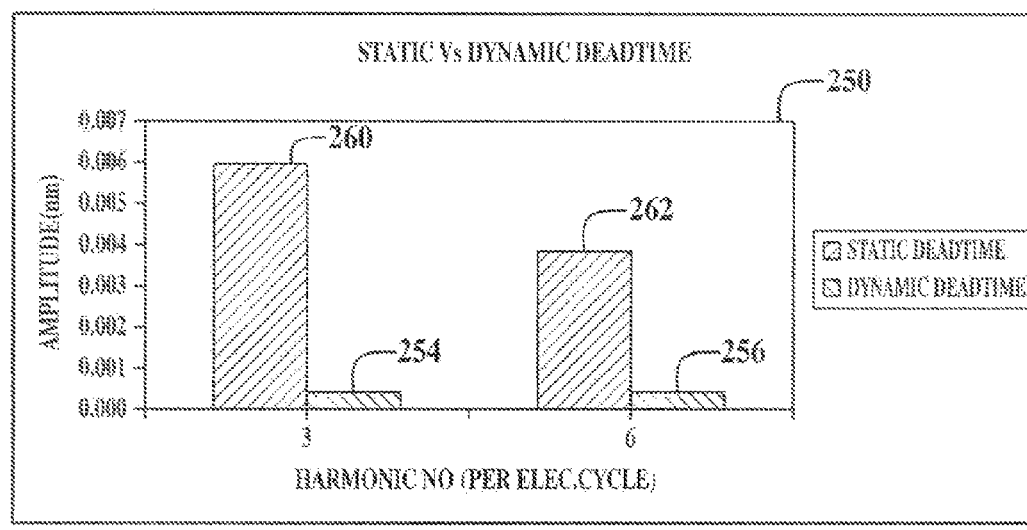
FIG. 10 is a graph having first and second bars indicating an amplitude of third and sixth harmonics of motor torque ripple for a static dead-time interval at a predetermined amount of motor torque, and third and fourth bars indicating an amplitude of third and sixth harmonics of motor torque ripple for a dynamic dead-time interval at the predetermined amount of motor torque.

Referring to FIG. 10, a graph 250 having bars 254, 256, 260 and 262 is illustrated. The bars 254 and 256 indicate an amplitude of third and sixth harmonics of motor torque ripple for a static dead-time interval at a predetermined amount of motor torque. The bars 260 and 262 indicate amplitudes of third and sixth harmonics of motor torque ripple for a dynamic dead-time interval at the predetermined amount of motor torque. As shown, an amplitude of the harmonics of the motor torque ripple for a dynamic dead-time interval (e.g., a dead-time interval that changes based on the average motor torque) is less than the amount of the amplitude of the harmonics of the motor torque ripple for a static dead-time interval.

The system and the method for adjusting a dead-time interval between de-activating a first transistor and activating a second transistor in a motor control circuit provide a substantial advantage over other systems and methods. In particular, the system and the method provide a technical effect of adjusting the dead-time interval based upon the commanded torque values, which reduce motor torque ripple.

As described above, the above-described method can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced item.

What is claimed is:

1. A method for adjusting a dead-time interval between de-activating a first transistor and activating a second transistor in a motor control circuit, the first and second transistors being electrically coupled in series with one another, the method comprising:
   determining a plurality of commanded torque values associated with a motor based on a received signal over time, each commanded torque value of the plurality of commanded torque values being indicative of a commanded torque level of the motor;
   setting the dead-time interval value equal to a first value when one commanded torque value of the plurality of commanded torque values is within a first torque range;
   decreasing the dead-time interval value as other commanded torque values of the plurality of commanded torque values increase over time within a second torque range, the second torque range being greater than the first torque range; and
   wherein the dead-time interval value is indicative of a desired dead-time interval.

2. The method of claim 1, further comprising:
   setting the dead-time interval value equal to a third value when one commanded torque value of the plurality of commanded torque values is within a third torque range, the third torque range being greater than the second torque range.

3. The method of claim 1, further comprising:
   decreasing the dead-time interval value as commanded torque values of the plurality of commanded torque values increase within a third torque range, the third torque range being greater than the second torque range.

4. The method of claim 1, further comprising:
   de-activating the first transistor at a first time; and
   activating the second transistor at a second time wherein a time interval between the first time and the second time corresponds to the dead-time interval value indicative of the desired dead-time interval.

5. The method of claim 1, wherein the desired dead-time interval is in a range of 100-250 nanoseconds.

6. A motor control system for adjusting a dead-time interval between de-activating a first transistor and activating a second transistor in a motor control circuit, the first transistor and the second transistor being electrically coupled in series with one another, the first and second transistors being electrically coupled to at least one motor winding, the motor control system comprising:
   a handwheel torque sensor configured to generate a signal indicative of commanded torque levels of a motor over time; and
   a controller configured to receive the signal and to determine a plurality of commanded torque values associated with a motor based on the signal, each commanded torque value of the plurality of commanded torque values being indicative of a commanded torque level of the motor, the controller further configured to set the dead-time interval value equal to a first value when one commanded torque value of the plurality of commanded torque values is within a first torque range, the controller further configured to decrease the dead-time interval value as other commanded torque values of the plurality of commanded torque values increase over time within a second torque range, the second torque range being greater than the first torque range, wherein the dead-time interval value is indicative of a desired dead-time interval.

7. The motor control system of claim 6, wherein the controller is further configured to set the dead-time interval value equal to a third value when one commanded torque value of the plurality of commanded torque values is within a third torque range, the third torque range being greater than the second torque range.

8. The motor control system of claim 6, wherein the controller is further configured to decrease the dead-time interval value as commanded torque values of the plurality of commanded torque values increase within a third torque range, the third torque range being greater than the second torque range.

9. The motor control system of claim 6, wherein the controller is further configured to de-activate the first transistor at a first time, the controller further configured to activate the second transistor at a second time wherein a time interval between the first time and the second time corresponds to the dead-time interval value indicative of the desired dead-time interval.

10. The motor control system of claim 6, wherein the desired dead-time interval is in range of 100-250 nanoseconds.

11. A method for adjusting a dead-time interval between de-activating a first transistor and activating a second transistor in a motor control circuit of a steering system, the first and second transistors being electrically coupled in series with one another, the method comprising:

determining a plurality of commanded torque values associated with a motor based on a received signal over time, each commanded torque value of the plurality of commanded torque values being indicative of a commanded torque level of the motor;

setting the dead-time interval value equal to a first value when one commanded torque value of the plurality of commanded torque values is within a first torque range;

decreasing the dead-time interval value as other commanded torque values of the plurality of commanded torque values increase over time within a second torque range, the second torque range being greater than the first torque range.

12. The method of claim 11, further comprising:

setting the dead-time interval value equal to a third value when one commanded torque value of the plurality of commanded torque values is within a third torque range, the third torque range being greater than the second torque range.

13. The method of claim 11, further comprising:

decreasing the dead-time interval value as commanded torque values of the plurality of commanded torque values increase within a third torque range, the third torque range being greater than the second torque range.

14. The method of claim 11, further comprising:

de-activating the first transistor at a first time; and activating the second transistor at a second time wherein a time interval between the first time and the second time corresponds to the dead-time interval value indicative of the desired dead-time interval.

15. The method of claim 11, wherein the desired dead-time interval is in a range of 100-250 nanoseconds.

* * * * *